Patented Sept. 6, 1949

2,480,991

UNITED STATES PATENT OFFICE 2,480,991

METHOD OF PRODUCING PENICILLIN PREPARATIONS

Oskar Wintersteiner, New Brunswick, and Harold B. MacPhillamy, Princeton, N. J., and Arthur E. O. Menzel, Grandview on Hudson, N. Y., assignors to E. R. Squibb & Sons, New York, N. Y., a corporation of New York No Drawing. Application November 26, 1941, Serial No. 420,596

2 Claims. (Cl. 260—302)

This invention relates to the production of penicillin preparations.

Penicillin is a bacteriostatic (or bactericidal) agent produced by various strains of the mold *Penicillium notatum* [Fleming, (1929) Brit. J. Exp. Path. 10, 226; and Chain et al., Lancet, 1940, II, 226]; and its effectiveness as a chemotherapeutic agent in certain clinical conditions has recently been demonstrated [Florey et al., Lancet, 1941, II, 177]. The only available method of producing penicillin preparations, however, is that described by Florey et al.

It is the object of this invention to provide a method of producing high-potency, non-toxic penicillin preparations suitable for medicinal use; and it is a futher object of this invention to provide a more convenient and efficient method of purifying (and concentrating) the penicillin in a penicillin-containing mold filtrate.

The mold filtrate referred to herein is the liquid obtained by growing a selected strain of the mold *Penicillium notatum* on a suitable medium until substantially maximum penicillin production has been attained, and filtering the culture medium.

The unit used in measuring the bacteriostatic potency of the various penicillin preparations described hereinafter may be defined as the amount of material which will completely prevent the growth of 0.5 cc. of a standard 6-hour culture of pneumococcus type III strain S, diluted 1:50.

It has been found that penicillin is an acidic substance which is not appreciably soluble in water. The acid is referred to herein as acid penicillin, to prevent confusion with "penicillic acid," which is a metabolic product of *Penicillium puberbulum* Bainier and *Penicillium cyclopium* Westling; and the salts of acid penicillin are referred to herein as neutral penicillin, whether in solid state or in aqueous solution of pH about 4 to 8. The alkali-metal (including ammonium) and alkaline-earth-metal salts of acid penicillin are readily soluble in water. Acid penicillin can be liberated from its salts by acidification with strong acids, such as phosphoric acid.

It has been found also that penicillin is stable in aqueous solution only between about pH 4 and about pH 8; when exposed at room temperature to reactions outside this pH range, it loses its activity within a few hours. The inactivation which takes place in highly acid solution (e. g. at pH 2) can be retarded by maintaining the temperature around 0° C., but even in the absence of an extraneous acid (e. g. with the penicillin preparation in the form of a solid powder, such as obtained by evaporation of a solution thereof in ether), acid penicillin loses most of its activity at 0° C. within a few days.

As indicated by these findings, it is essential (in order to prevent extensive loss of activity) to avoid operations in which the penicillin exists as acid penicillin for a prolonged time; and this precaution is particularly important in the initial purification treatments, which entail operations with large volumes of solvents, and consequently require considerable time.

In the method of this invention, the initial purification (and concentration) is effected with the penicillin in the stable salt form. Thus, the method of this invention essentially comprises adjusting the pH of a penicillin-containing mold filtrate to about 5.5–6.5, and separating the resultant neutral penicillin from the mold filtrate. Preferably, the pH of the mold filtrate is adjusted to about 6.0; and the neutral penicillin is separated from the mold filtrate by extraction with a slightly water-miscible organic solvent, especially an aliphatic alcohol having four to eight carbon atoms, such as n-butanol and amyl alcohol.

When the pH of the mold filtrate is adjusted to about 6.0 and the filtrate is exhaustively extracted with n-butanol, practically all of the activity is recovered in the n-butanol phase (since dry n-butanol does not readily dissolve solid neutral penicillin, the extractability from an aqueous solution is probably due to the solvent action of the water that passes into the n-butanol phase). The residue of the n-butanol extract has about ten times the potency of the mold-filtrate solids; and the inert material in the aqueous phase comprises the inorganic constituents of the culture medium as well as a considerable quantity of organic pigmented material.

The method of this invention also essentially comprises treating the residue of the n-butanol solution to remove therefom a variety of yellow and orange inactive poducts, most of which, like penicillin are acidic. Thus, the residue is fractionated by distribution between an aqueous lower aliphatic alcohol (especially 50% methanol) and a solvent of the benzene series (especially benzene), substantially all of the activity passing into the aqueous-alcohol solution and the pigments into the benzene-series solvent. The residue of the solution in the benzene-series solvent is practically devoid of activity and represents 40-50% of the weight of the n-butanol-solution residue; and the residue from the aqueous-alcohol solution has therefore about twice the potency of the n-butanol-solution residue.

The aqueous-alcohol solution may be dried by vacuum distillation, yielding a yellow, water-soluble powder (a neutral-penicillin preparation) suitable for clinical use. Preferably, however, this preparation is further purified by adjusting the pH of an aqueous solution thereof to about 2, extracting the acid penicillin with ether (or other solvent for acid penicillin, e. g. chloroform, benzene, and ethyl acetate), and treating the ether solution with an aqueous suspension of an alkaline-earth-metal carbonate, e. g. calcium carbonate. The yellow aqueous solution thus obtained contains the calcium salt of acid penicillin; and the salt, recovered by removal of the solvent, contains only calcium as the cation, is stable and readily soluble in water, has about twice the potency of the aqueous-alcohol residue, and represents about 70–80% of the activity of the aqueous-alcohol fraction. The increase in potency in this step is due to the removal of pigmented products, which remain partly in the original acidified aqueous solution and partly in the ether.

If it is not desired to prepare the dry, stable calcium salt at this stage, an alternative procedure may be used which yields stable solutions of penicillin suitable for further purification. Thus, buffers having a pH of about 5 may be substituted for the calcium-carbonate suspension for re-extracting the active principle from the ether, the penicillin being preferentially extracted at this pH, while other, more weakly acidic, products remain in the ether phase. (This treatment and that with the calcium-carbonate suspension are based on the same principle, i. e., differential extraction of penicillin due to its greater acidity as compared with that of the impurities). The penicillin present in the buffer solution may be transferred to ether solution (after acidification), and then either converted into the calcium salt by the hereinbefore-described procedure, or subjected in the form of acid penicillin to further purification by adsorption and fractional elution. In the latter case, the acid penicillin is dissolved in a solvent of the benzene series (especially benzene) containing a minor proportion of a lower aliphatic alcohol (especially 10% ethanol); and the acid penicillin is adsorbed therefrom on calcium sulfate (or equivalent mild, neutral adsorbent) and the adsorbate exhaustively washed with the hydrocarbon solvent. The filtrate contains only products of comparatively low potency, most of the penicillin being retained by the calcium sulfate. On further elution with a combination solvent of the type used for the adsorption, and evaporation of the eluate in vacuo, a fraction assaying 5,000–10,000 units per mg., and containing about 80% of the activity of the material subjected to the adsorption treatment, is obtained. This highly potent material is then stabilized by dissolving it in a buffer solution suitable for parenteral administration, e. g. a mixture of primary and secondary alkali metal phosphates of pH about 7, or by extracting the aforementioned eluate with calcium-carbonate suspension as described hereinbefore to obtain the stable calcium salt.

The following examples are illustrative of the invention:

*Example 1*

(a) 4.4 liters of the mold filtrate (having a solids content of 7.8 mg./cc.—or a total of 34.3 g.—and a potency of 400 units/cc.—or a total activity of 1,715,000 units—and the solids of which have a potency of 51 units/mg.) is adjusted to pH 6.0, and extracted five times with 880 cc. portions of n-butanol. The extracts are combined, evaporated to dryness in vacuo (the temperature not exceeding 40° C. during the distillation). The residue (A)—about 2.3 g., or 6.6% of the solids in the mold filtrate—has a potency of 640 units/mg.; which represents 12.5 times the original potency, and a total activity of 1,472,000 units, an 88% recovery of activity.

(b) 1.35 g. of product A is dissolved in 135 cc. methanol, and an equal volume of water is added. The solution is then shaken with 135 cc. benzene in a separatory funnel, the mixture allowed to separate, and the aqueous-methanol layer is passed into 135 cc. benzene in a second separatory funnel and the extraction repeated. After repeating the benzene extraction a third time, the aqueous methanol solution is transferred to a flask for concentration. The three benzene solutions are then washed—in the same order as in the series of extractions—with 135 cc. of a 50% aqueous solution of methanol, and the same procedure is repeated with another 135 cc. portion of a 50% aqueous solution of methanol. The three aqueous methanol solutions are combined and concentrated under vacuo at 40° C. until foaming makes further distillation difficult. The remaining 150 cc. (B) has a solids content of 3.9 mg./cc.—or a total of 585 mg. (43.4% of the solids of A)—and a potency of 1280 units/mg. (twice the potency of A); and its total activity of 750,000 units represents an 87% recovery from A.

(c) Solution B is adjusted to pH 2 by the addition of 5% phosphoric acid, and immediately extracted five times with 50 cc. portions of ether, the temperature before acidification and during the extraction being maintained at about 0° C. by the continuous addition of ice. The ether extracts are combined, washed with 25 cc. ice water, and then extracted five times with 40-cc. portions of a citrate-phosphate buffer of pH 5.0. The resulting solution (C) has a solids content of 0.520 mg./cc., or a total of 106.6 mg. (as determined by ether extracton of a reacidified aliquot), a potency of 6000 units/mg. (5 times the potency of B), and a total activity of 639,000 units (representing an 85% recovery, and an overall recovery of 66% of the activity contained in the corresponding portion of the mold filtrate).

(d) 300 cc. of solution C is acidified to pH 2 with phosphoric acid, and extracted five times with 50-cc. portions of ether, the temperature before acidification and during the extraction being maintained at about 0° C. by the addition of ice. The ether extracts are combined, washed with ice water, and the ether removed under vacuo; 55 mg. of a yellow material (D) is obtained, having a potency of 4500 units/mg.

(e) 54.2 mg. D (containing about 250,000 units) is dissolved in 0.5 cc. absolute alcohol, and diluted with 50 cc. benzene; and the mixture is then passed through a 150 mm. x 18 mm. tube containing calcium sulfate previously activated by heating. The column is washed with benzene and with 10% and 50% solutions of absolute alcohol in benzene, fractionation being as follows:

| Fractions (solvents) | Weight of solute (mg.) | Potency of solute (units/mg.) | Total activity of solute (units) |
|---|---|---|---|
| (1) 20 cc. benzene | 4.6 | 20 | 92 |
| (2) 20 cc. benzene | 18.5 | 20 | 370 |
| (3) 20 cc. benzene | 0 | | |
| (4) 40 cc. 10% solution of absolute alcohol in benzene | 22 | 10,000 | 220,000 |
| (5) 40 cc. 50% solution of absolute alcohol in benzene | 8 | 640 | 5,120 |

The product obtained on removal of the solvent from fraction 4 (by evaporation in vacuo) is a highly potent (10,000 units/mg.), non-toxic, penicillin preparation suitable for medicinal use, e. g. by intravenous administration of a suitable aqueous solution thereof (or of a salt thereof, such as the sodium salt); and it may be stabilized by dissolving it in a buffer solution of pH 7, or by converting it into the stable calcium salt (by treating fraction 4 with a calcium-carbonate suspension as described hereinafter).

*Example 2*

A mold filtrate is treated as described under (a) and (b) in the foregoing example, to obtain solution B, and the solids recovered therefrom by removing the aqueous-methanol solvent (by evaporation in vacuo).

1455 mg. of these solids (having a potency of 320 units/mg.) is dissolved in water to make 300 cc. The solution (having a total activity of 466,000 units) is chilled by adding ice, acidified to pH 2 with phosphoric acid, and extracted with a 150-cc. portion of ether and then with two 100 cc. portions of ether; and the ether solutions are combined and immediately shaken (in the presence of ice) with 40 cc. of a 1% aqueous suspension of pure calcium carbonate having a pH of 7.4 The extraction is repeated seven times with equal volumes of the suspension, and the extracts (having a pH of 5.3) are combined, filtered, and evaporated to dryness in vacuo, yielding 297 mg. of a yellow powder having a potency of 1280 units/mg., and a total activity of 380,000 units (82% recovery). The product is a stable, non-toxic, readily water soluble preparation of the calcium salt of penicillin, suitable for medicinal use. Five more extractions of the ether solution with calcium-carbonate suspension yield a solution having a pH of 7.2 and a total activity of 36,000 units (8% of the total activity).

The invention may be variously otherwise embodied—as by using the herein-described steps and procedures in combinations and orders other than those disclosed—within the scope of the appended claims.

We claim:

1. In the method of producing penicillin preparations, the steps of adjusting the pH of a penicillin-containing mold filtrate to about 5.5–6.5 and extracting the resultant penicillin salt with an aliphatic alcohol having four to eight carbon atoms.

2. In the method of producing penicillin preparations, the steps of adjusting the pH of a penicillin-containing mold filtrate to about 5.5–6.5 and extracting the resultant penicillin salt with n-butanol.

OSKAR WINTERSTEINER.
HAROLD B. MacPHILLAMY.
ARTHUR E. O. MENZEL.

REFERENCES CITED

The following references are of record in the file of this patent:

Biochem Journal, 1932 (2), p. 1917.
Abraham Lancet II, 178–180, August 16, 1941.
Principles and Practice of Chromatographic Adsorption, by Bacharach, 1941, page 50.